United States Patent [19]

Hartt

[11] 4,301,981
[45] Nov. 24, 1981

[54] AIRCRAFT WITH ROTARY WING

[76] Inventor: Joseph Hartt, 7503 Marin Dr., Suite 3, B-C, Englewood, Colo. 80110

[21] Appl. No.: 53,217

[22] Filed: Jun. 29, 1979

[51] Int. Cl.³ .......................................... B64C 29/00
[52] U.S. Cl. ................................ 244/12.2; 244/17.11; 244/73 B; 244/39; 416/24; 416/101; 416/108
[58] Field of Search ................ 244/12.2, 23 C, 17.11, 244/17.19, 17.21, 17.23, 73 B, 73 C; 416/17, 23, 24, 101, 108

[56] References Cited

U.S. PATENT DOCUMENTS

| | | | |
|---|---|---|---|
| 996,366 | 6/1911 | Roberts | 244/73 C |
| 1,102,016 | 6/1914 | DeSaulles | 416/108 |
| 1,786,017 | 12/1930 | Matta | 244/23 C |
| 2,547,266 | 4/1951 | Hoglin | 244/12.2 |
| 3,181,811 | 5/1965 | Maksim | 244/12.2 |
| 3,572,613 | 3/1971 | Porter | 244/12.2 |

*Primary Examiner*—George E. A. Halvosa

*Attorney, Agent, or Firm*—Sheridan, Ross, Fields & McIntosh

[57] ABSTRACT

An aircraft is provided with a wing in the form of an annulus having an airfoil shape in radial section, the wing being concentrically mounted on a vertical axle shaft which in turn is rotatably carried by a mounting on the fuselage. Rotation of the wing drives air centrifugally across the upper and lower surfaces to energize the boundary layer, enhance laminar flow, and produce lift. Vanes may be mounted on the inner portion of the surface to increase the flow and thus produce greater life. The vanes may be attached to a stabilizer ring which is eccentrically adjustable by a controlling mechanism to vary the extension of the vanes into and out of the wing at various points in the cource of rotation and thus vary the degree of lift produced. The wing may also be provided within its inner perimeter with airfoil lifting blades which produce additional lift, and the blades may be swung by a stabilizer ring to positions producing a desired thrust in a desired direction as the wing rotates.

11 Claims, 20 Drawing Figures

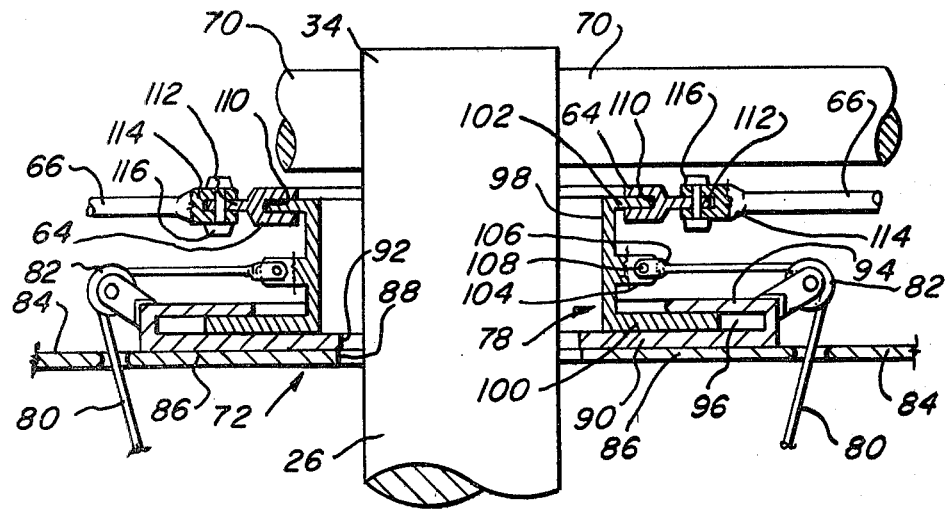
Fig_20
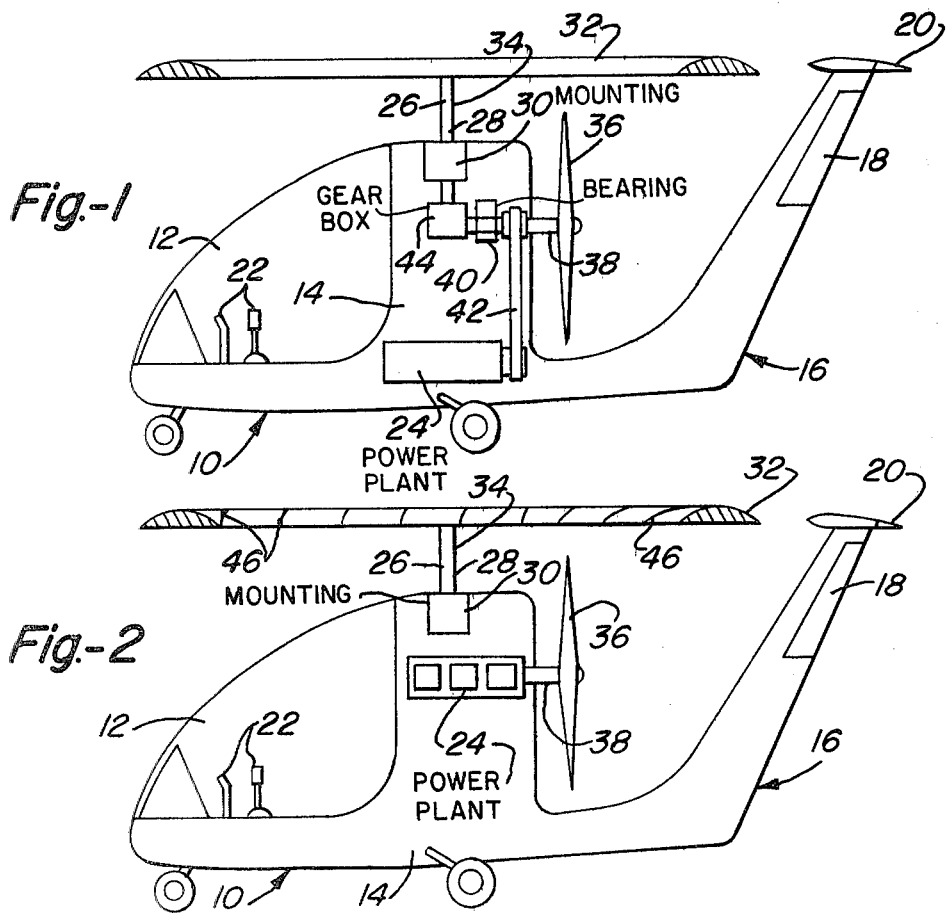
Fig.-1
Fig.-2

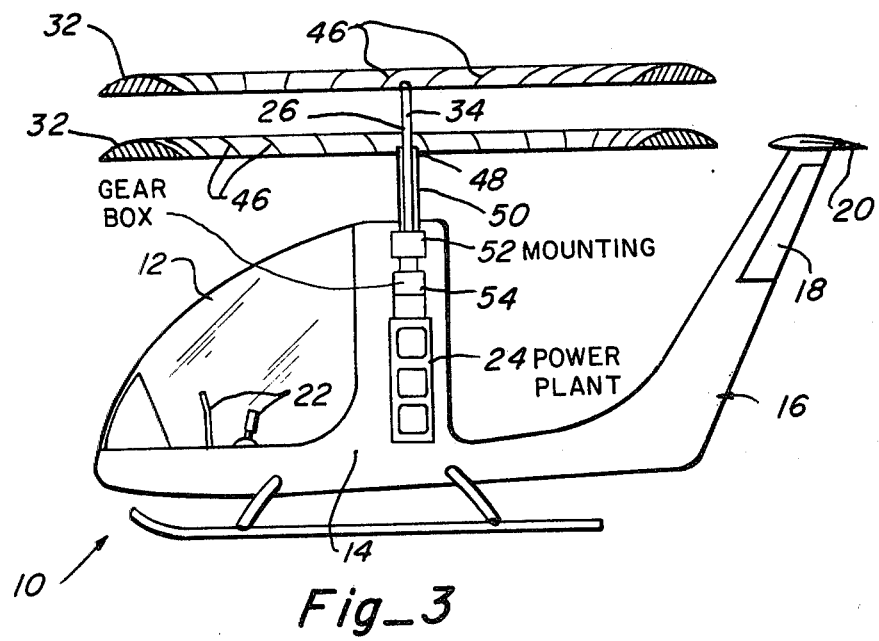
Fig_3
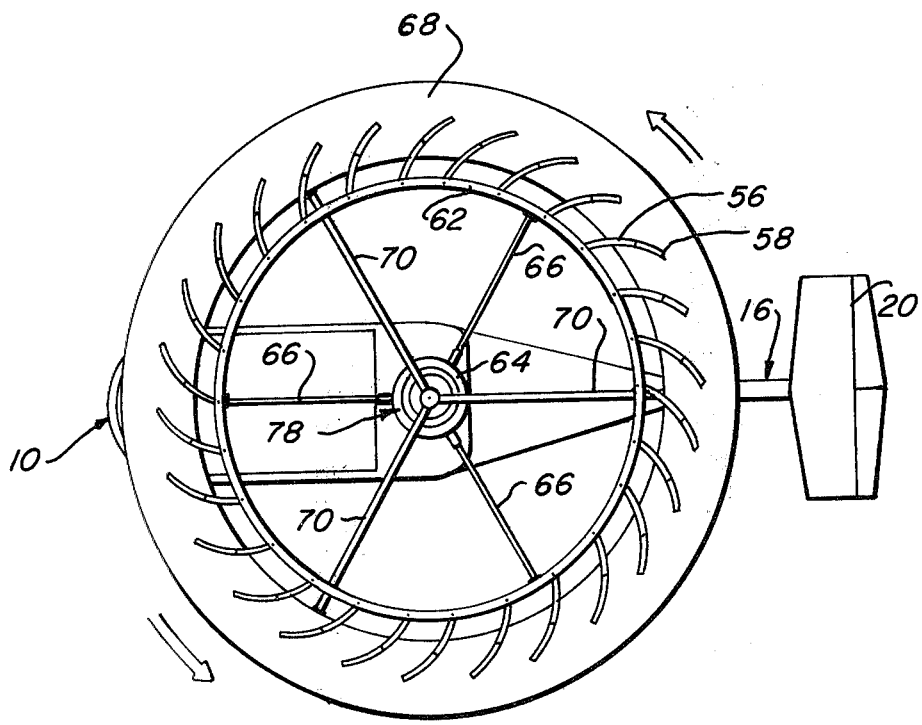
Fig_4

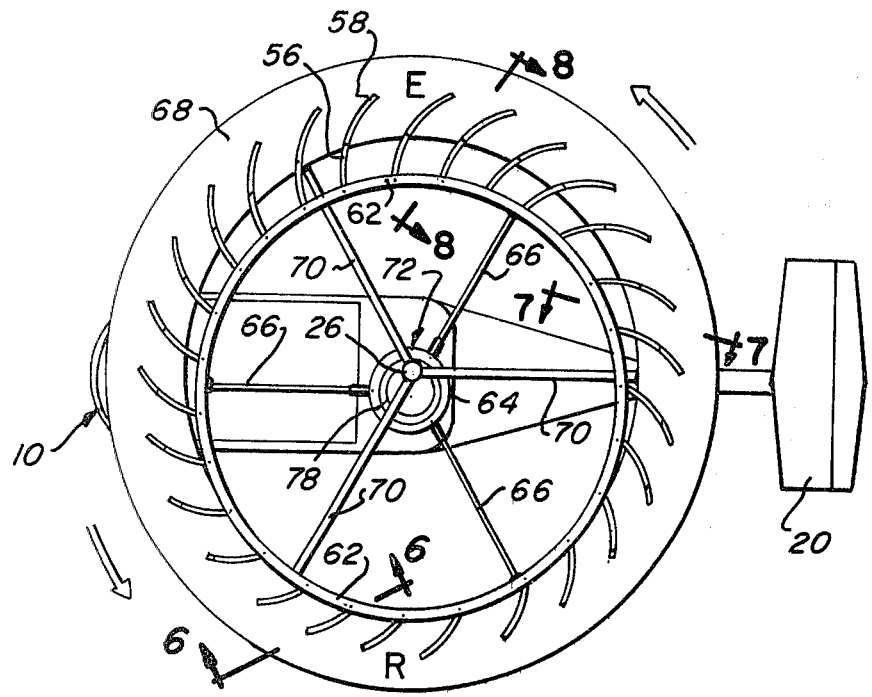
Fig_5
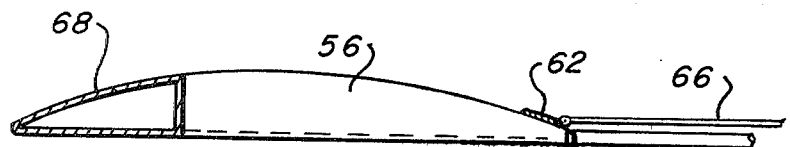
Fig_6
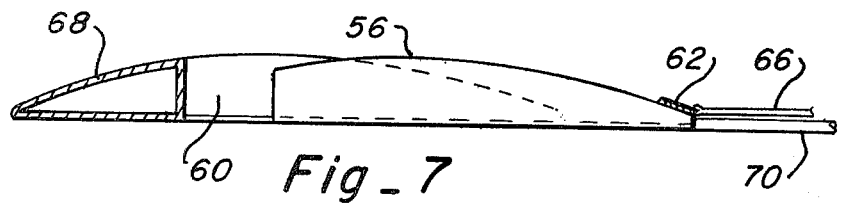
Fig_7
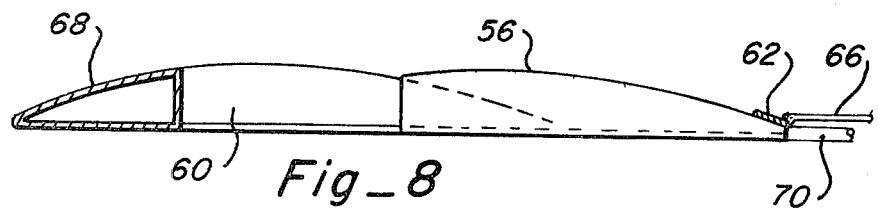
Fig_8

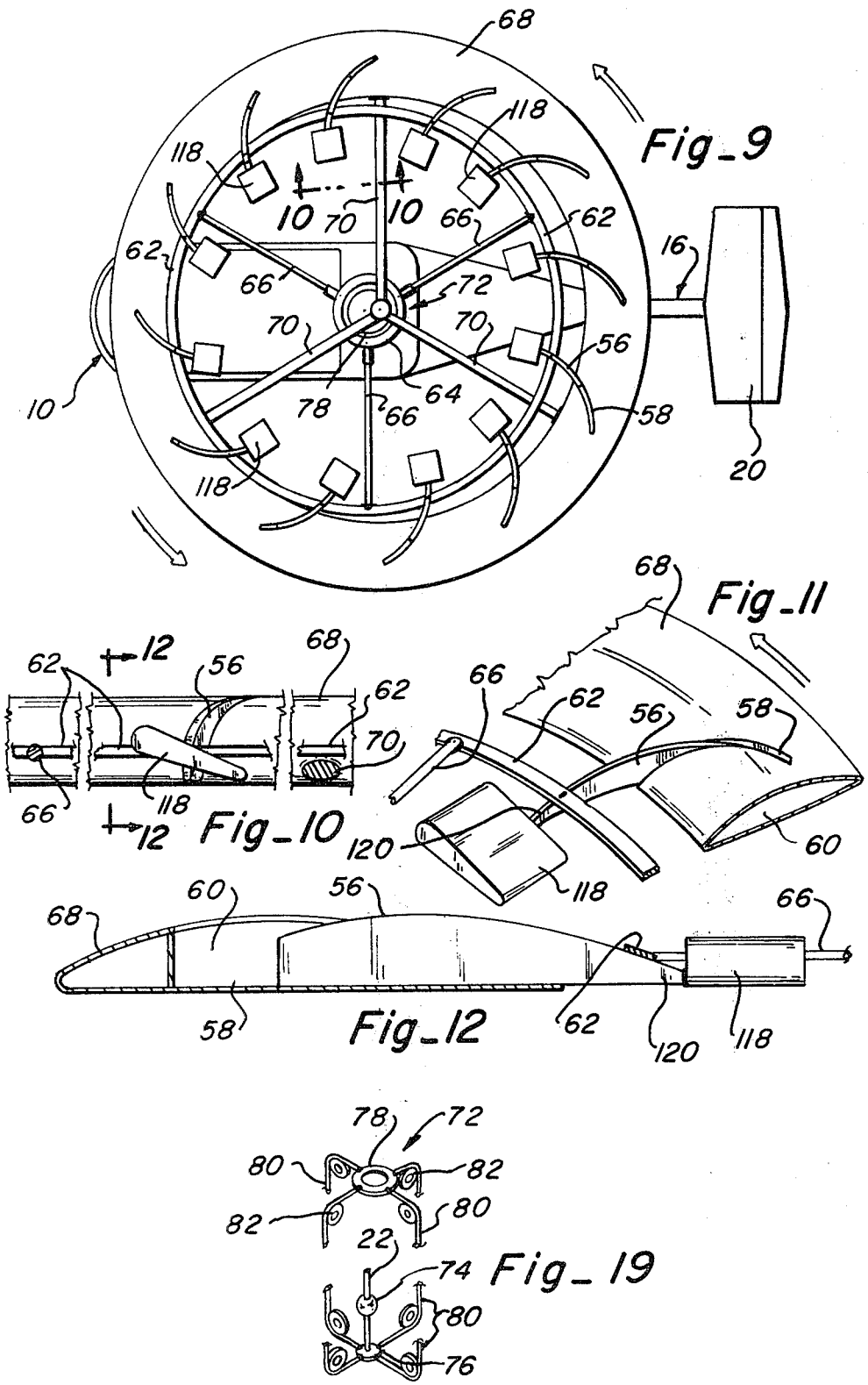

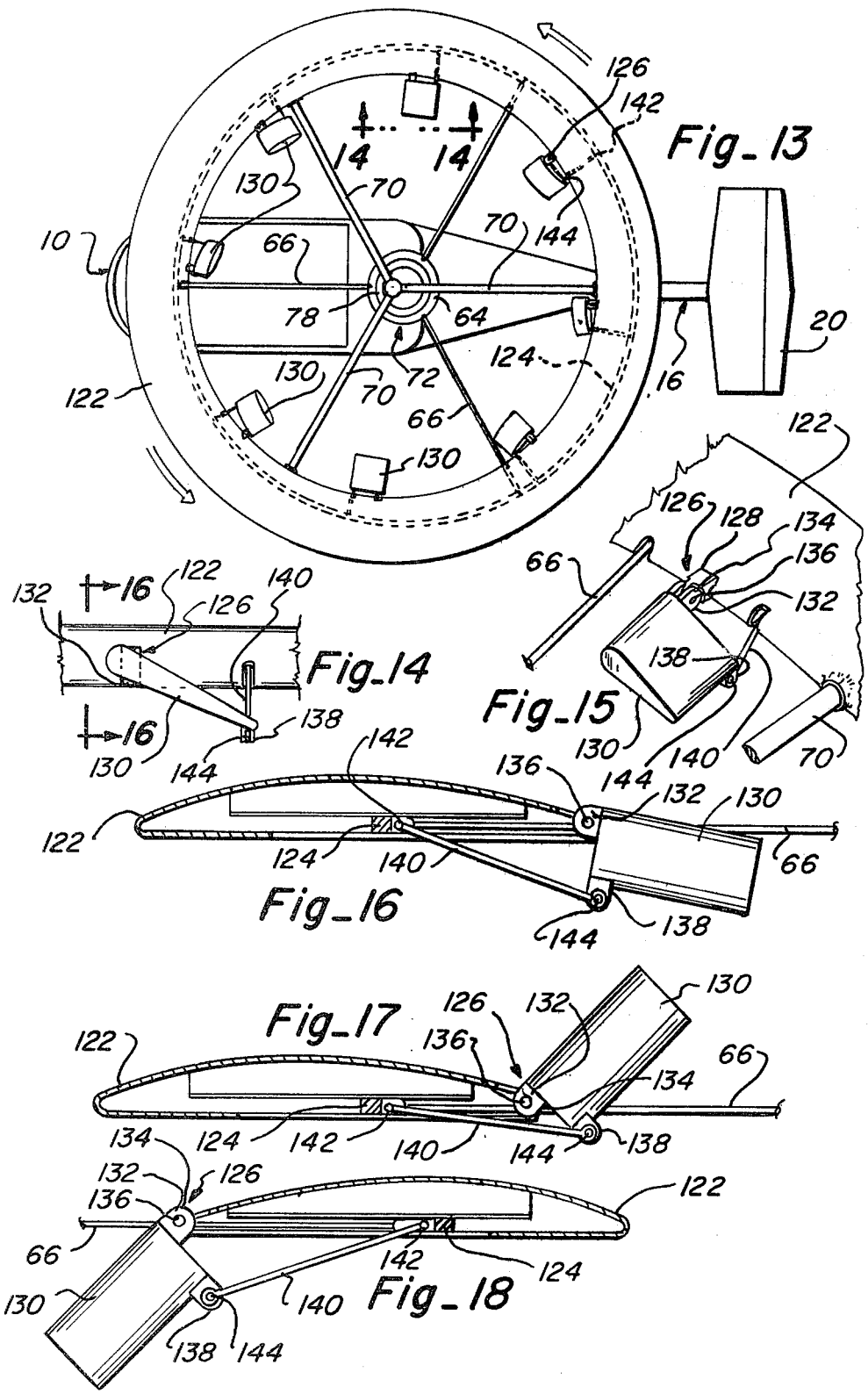

4,301,981

AIRCRAFT WITH ROTARY WING

DESCRIPTION

1. Technical Field

This invention relates to aircraft having annular wings and, more particularly, to an aircraft having an annular wing which rotates in its own plane to produce lift. It relates also to such a wing having devices connected thereto which increase the lift beyond that generated by the wing itself and which are capable of varying the amount of the extra lift which is generated.

2. Background Art

Many efforts have been made over the years to develop an aircraft, especially in the small aircraft class, which would have a relatively small wing span in comparison with the type presently in use. One scheme is illustrated by the U.S. Pat. Nos. 2,515,587 to Blandin and 2,730,312 to Crookes which show circular or disk like wings having a chord equal to the span and intended to fly in the usual manner. The U.S. Patent to Taylor, U.S. Pat. No. 3,253,805, shows an airplane having a fixed generally annular wing, the chord of the forward portion being somewhat greater than that of the aft portion. All of these are intended for conventional straight forward flight.

An example of the vertical lift type is shown in U.S. Pat. No. 3,104,853 to Klein which shows an annular fixed wing with a centrifugal fan in the center opening which blows air radially out over the wing to create lift. When the craft is tilted, a horizontal force vector is produced which causes generally horizontal flight in a desired direction. The U.S. Pat. No. 1,786,017 to Matta shows an aircraft having two annular wings in tandem with a centrifugal fan in the center opening of each wing to blow air radially over the wings to create lift. Deflector rings are arranged around the forward portion of each wing to reverse the flow of the exiting air and produce horizontal thrust.

None of the above references discloses a simple direct lift aircraft in which a rotating annular wing produces direct lift and is tiltable to supply a horizontal thrust vector and which may be provided with movable means for varying the lift at desired points about its circumference.

DISCLOSURE OF THE INVENTION

An aircraft in accordance with the disclosure herein includes a fuselage provided with a power plant, a pilot's compartment having pilot operated control means and directional control surfaces. A vertically extending axle shaft is rotatably mounted at its lower end on the fuselage. An annular wing is coaxially mounted at the upper end of the shaft and is rotatable about the axis of the shaft. The rotation of the wing applies centrifugal force to the air adjacent to the upper and lower surfaces to cause radial flow across the surfaces from the inner edge of the wing to the outer edge and produce a lifting force. This centrifugal force acts on the particles of air in the boundary layer to break them loose from the surface and enhance the laminar flow, thus increasing the total lift produced.

Various attachments may be added to the wing to increase the radial flow of air and increase the lift or to vary the lift from point to point around the circumference of the wing. Upstanding vanes may be connected to the radially inner portion of the upper surface of the wing to engage the air and drive it more forcefully in a radially outward direction. The vanes may be movable for retraction into and extension out of the contour of the wing and an eccentrically adjustable stabilizer ring may be connected to the vanes to vary the degree of their extension in the course of rotation and thus vary the amount of added lift they produce at different points around the path of travel of the wing. Also direct lifting vanes may be arranged around the inner periphery of the annular wing, and these may be fixed in attitude or adjustable to vary their lift and produce a horizontal thrust vector on occasion.

Thus it will be seen that the present invention provides an aircraft adapted to achieve flight in various modes including generally vertical ascent and descent, hovering, and lateral travel.

BRIEF DESCRIPTION OF THE DRAWINGS

Various other advantages and features of novelty will become apparent as the description proceeds in conjunction with the accompanying drawings, in which:

FIG. 1 is a diagrammatic side elevational view of a rotary wing aircraft embodying one form of the invention;

FIG. 2 is a view similar to FIG. 1, with a modified form of wing;

FIG. 3 is a view similar to FIG. 1, with a second wing concentric with and below the firt and rotating in the opposite direction;

FIG. 4 is a top plan view of an aircraft having lift modifying means and controlling means therefor in neutral position;

FIG. 5 is a view similar to FIG. 4 illustrating the lift modifying means and controlling means in a displaced position;

FIG. 6 is an enlarged sectional view taken on line 6—6 of FIG. 5;

FIG. 7 is an enlarged sectional view taken on line 7—7 of FIG. 5;

FIG. 8 is an enlarged sectional view taken on line 8—8 of FIG. 5;

FIG. 9 is a view similar to FIG. 5 showing direct lift airfoil blades carried by the inner ends of the vanes;

FIG. 10 is an enlarged elevational view, partly in section, taken on line 10—10 of FIG. 9;

FIG. 11 is a fragmentary perspective view of the construction shown in FIG. 10;

FIG. 12 is a sectional view taken on line 12—12 of FIG. 10;

FIG. 13 is a top plan view of the rotary wing with controllable airfoil blades for producing lift and thrust;

FIG. 14 is a fragmentary enlarged elevational view taken on line 14—14 of FIG. 13;

FIG. 15 is a fragmentary perspective view of the construction shown in FIG. 14;

FIG. 16 is a sectional view taken on line 16—16 of FIG. 14 showing an airfoil blade in neutral position;

FIG. 17 is a view similar to FIG. 16, showing the blade in an up position to produce thrust directed inward of the wing while still providing some lift;

FIG. 18 is a view similar to FIG. 15, showing the blade in a down position to produce thrust directed outward of the wing while still producing some lift;

FIG. 19 is a diagrammatic perspective view showing a part of a controlling mechanism for the variable lift devices, a pilot operated control means, and connections between them; and FIG. 20 is a diagrammatic elevational view showing one possible controlling mechanism for the variable lift devices.

BEST MODES FOR CARRYING OUT THE INVENTION

An aircraft incorporating one form of the invention is diagrammatically illustrated in FIG. 1, in which a fuselage 10 includes a pilot's compartment 12, a power plant compartment 14, and a tail assembly 16 having a rudder 18 and split elevator 20 to allow for control of pitch and roll. Pilot operated control means 22 are located in compartment 12 and a power plant 24 is located in compartment 14. A vertically extending axle shaft 26 is rotatably carried at its lower end 28 in a mounting 30 in the upper part of the fuselage, and a rotary wing 32 is concentric with and secured by radial struts 70 (FIG. 4) to the upper end 34 of the axle shaft for rotation therewith. The wing is in the form of an annulus having an airfoil shape in radial section at all points around its circumference, and preferably the airfoil shape is symmetrical in chordal section to produce lift from relative airflow inward or outward over the wing.

In this form of the invention a thrust propeller 36 is carried by propeller shaft 38 rotatable in bearing 40. A drive belt 42 connects the engine to the propeller shaft and the latter in turn is connected through gear box 44 to the axle shaft 26 to drive the rotary wing.

When the wing rotates and the aircraft is not moving laterally, the wing applies centrifugal force to the air adjacent to the upper and lower surfaces to cause radial flow across the surfaces from the inner edge of the wing to the outer edge and produce a lifting force. This centrifugal force acts on the particles of air in the boundary layer to break them loose from the surface and enhance the laminar flow, thus increasing the total lift produced.

The directional control surfaces are located behind the wing and at such level that they operate in the airstream flowing rearward from the wing and therefore are capable of controlling the attitude and direction of the craft in climb, descent, and hoverying flight.

When the aircraft is hovering, a very slight movement of the elevator will pitch the wing downward, for example, producing a horizontal thrust vector in the forward direction to add to the effect of the propeller. As forward speed increases, the relative wind will overcome the centrifugal effect at the forward portion of the wing and air will flow over it toward the aft portion, producing lift and adding to the forward thrust effect of the rear portion.

A modified form of the aircraft is illustrated in FIG. 2 in which the axle shaft is not connected to the power plant and the wing is freely rotatable, while the propeller shaft 38 is directly connected to the power plant 24. In this form, a plurality of fixed air directing vanes 46 are mounted to the upper surface of the inner portion of the wing and are spaced generally equally around the inner periphery. Each vane extends substantially vertically and is arcuately curved in the planform of the wing in the manner indicated in the movable vanes in FIG. 4. The inner end of each vane is curved or angled rearwardly to a predetermined extend with respect to the intended direction of rotation of the wing, and the rearward angle or curve becomes increasingly more acute from the inner end of the vane to the outer end. The wing is adapted to be rotated during forward translation by the unequal reaction of the convex and concave faces of the vanes presented to the relative airstream at laterally opposite side portions of the wing. The wing in this form as in all of the other forms of the rotary wings of this invention is free of any obstruction to the flow of air at any point around its outer periphery.

The modification of FIG. 3 consists of two rotary wings 32 of the type shown in FIG. 2 arranged concentrically one below the other with the lower wing being mounted at the upper end 48 of hollow axle shaft 50 which surrounds shaft 26. The lower ends of both shafts are rotatably carried in mounting 52 and are connected to gear box 54 on power plant 24. The gear box contains the necessary gearing to cause the two axle shafts and their wings to rotate in opposite directions to eliminate torque effect on the aircraft. When the wings are pitched down to the desired extent by the use of elevator 20, suitable horizontal thrust component is produced to move the aircraft forward. On each wing the upstanding fixed vanes are arcuately curved in the planform of the wing and are angled rearwardly with respect to the direction of rotation of the particular wing to force the outward airflow in a radial direction.

Various attachments may be added to the rotary wing to increase the radial flow of air and increase the lift of the wing and to vary the amount of added lift from point to point around the circumference of the wing. One such arrangement is shown in FIGS. 4 to 8. Vanes 56 are mounted on the wing 68 along the upper surface of the inner portion of the wing and are substantially equally spaced around its inner periphery. The vanes have the curvature in the planform of the wing and the rearwardly angling attitude with respect to the direction of rotation which has been previously described, and the curvature combined with the wing rotation causes the air to flow radially outward across the wing.

Instead of a fixed mounting as contemplated in the previous forms, these vanes are movable. A slot 58 for each vane is formed in the upper radially inner surface and the interior of the wing. Each slot has the same curvature as the vane and also is angled rearwardly to the desired extent, as is the chamber 60 within the wing to which the slot leads. Each vane slides generally radially into its slot and chamber and is of such size and shape that when it is fully retracted, its upper edge is substantially flush with the upper surface and it has no effect on the surrounding air. This condition is illustrated in FIG. 6.

To control the extension and retraction of the vanes, a stabilizer ring 62 is provided. This ring, as can best be seen in FIGS. 6 to 8, is flexibly connected to each vane quite close to its inner end. The stabilizer ring is smaller in diameter than the inner periphery of the wing and when it is held in neutral position, it maintains all of the vanes in equal partly extended position as shown in FIGS. 4 and 7. When the stabilizer ring is fully displaced laterally or eccentrically, as shown in FIG. 5, the vanes at one point are fully extended as shown in FIG. 8 while the diametrically opposite vanes are fully retracted as shown in FIG. 6. The amount of extension of each vane successively around the circle gradually increases through 180 degrees from the FIG. 6 condition to the FIG. 8 condition and then gradually decreases through the next 180 degrees. Since the stabilizer ring rotates on its eccentric axis with the wing, each vane will be at a given amount of extension at the same location in the path of travel. This is illustrated in FIG. 5 where it will be seen that as each vane reaches point E, it will be fully extended and as it reaches point R, it will be fully retracted. The stabilizer ring is located concentrically in FIG. 4 and it will be seen that the vanes are equally partially extended at all points around the path of travel.

The curvature of the stabilizer ring in a vertical plane passing radially through the ring and the wing corresponds to the curvature of the radially inner portion of the upper surface of the wing, and any part of the ring which is momentarily in contact with the wing, as in FIG. 6, will lie substantially flush on its upper surface. Any part of the ring which is radially separated from the wing, as in FIGS. 7 and 8, serves as an air flow guide to enhance laminar flow over the upper surface of the wing.

The lateral position of the stabilizer ring is controlled by control ring 64 which is connected to the stabilizer ring by a plurality of radially extending tie rods 66. The control ring is a part of the controlling mechanism 72 which is generally centered around the upper end of axle shaft 26 and is actuated by a part of the pilot operable control means 22. A diagrammatic showing of the connections of the parts appears in FIG. 19. Control means 22 is carried by a pivotal mounting 74 and is connected to plate 76 at its lower end to displace it laterally in any desired direction. A guide member 78 is connected to plate 76 by cables 80 running over pulleys 82 and is moved laterally in response to lateral movements of control means 22.

One construction of controlling mechanism 72 which may be used for the purpose of the invention is diagrammatically illustrated in FIG. 20. A pylon structure 84 having a flat upper section 86 is secured to the top of fuselage 10 and is formed with a central aperture 88 to provide clearance for axle shaft 26. A mounting plate 90 having a similar central aperture 92 is fixedly mounted on section 86 and has a vertically spaced inwardly extending flange 94 to form an annular mounting channel 96.

Guide member 78 includes a vertically extending cylinder 98 having at its lower end an outwardly extending flange 100 which slidably fits in channel 96 for lateral movement in all directions. The inner diameter of the cylinder is large enough to allow the maximum required lateral movement of the cylinder without interference with rotating shaft 26. The dimensions of flange 94 and 100 are selected to limit the lateral movement of the cylinder to the desired extent and to prevent separation of the cylinder from the mounting plate. The upper end of the cylinder is formed with a radially shorter flange 102, and four lugs or ears 104 are spaced equally around the midportion of the outer wall to receive clevises 106 at the ends of cables 80, the clevises being connected to the ears by conventional clevis pins 108.

Control ring 64 is formed with an inwardly facing channel 110 which surrounds flange 102 in a running fit and is formed with ears 112 to mount clevises 114 by means of clevis pins 116. The clevises are at the inner ends of the tie rods 66 which are connected at their outer ends to the stabilizer ring. In operation, considering FIGS. 4, 5, and 20, the stabilizer ring rotates with the wing, and the tie rods and control ring rotate with the stabilizer ring. The control ring rotates around flange 102 of the guide member and is always concentric with it. In FIG. 4, the guide member is concentric with the axle shaft and therefore the control ring and the stabilizer ring are also concentric with the shaft and with the wing, and all of the vanes are equally partially extended. This corresponds with the showing of FIG. 20. If cables 80 are moved by member 22 to move cylinder 98 the full distance laterally then the control ring and stabilizer ring will be similarly displaced laterally or eccentrically so that their center of rotation will be as seen in FIG. 5. Thus, as any given vane approaches point R, it will gradually be fully retracted and as it approaches point E, it will gradually be fully extended. Therefore, the vanes in the vicinity of R will be ineffective and those in the vicinity of E will be fully effective, the total lift at E will be greater than at R, and the wing will pitch down at R, with a resulting horizontal thrust component in the direction of R to produce forward travel in that direction.

One arrangement for further increasing the total lift is illustrated in FIGS. 9 to 12. This form includes all of the features of FIGS. 4 to 8 but adds a plurality of lifting airfoil blades 118. A blade is provided for each vane and is fixedly attached to the inner end of its respective blade by an extension arm 120 extending generally radially inward from the inner end of the vane. The blade is set at a suitable positive angle of attack and operates at this angle at all times. Consequently, the blades produce substantially the same amount of lift at all times during their rotation even though they move radially inward and outward with their respective vanes as controlled by the controlling mechanism.

Another modification of the present invention is illustrated in FIGS. 13 to 18. A rotary wing 122 driven by the power plant in the fuselage is provided only with lifting airfoil blades instead of radially extending vanes. The blades are movable on their mountings in such fashion that they produce greater or less lift at various points in their path of travel and produce forward thrust components during the forward and aft portions of their path of travel.

The wing is provided with the same basic controlling mechanism 72 as in previous forms but the stabilizer ring 124 is located within the body of the wing and connected to tie rods 66 to be actuated in the same way. A plurality of brackets 126 are fixedly mounted to the wing at spaced points around its inner periphery and each bracket has a hinge mounting 128 with its axis parallel to the general plane of the wing and substantially tangent to the inner periphery of the wing at the location of the bracket. A lifting airfoil blade 130 is provided for each bracket and includes a fixed lug 132 at its inner side adjacent to the leading edge. The lug has a hinge portion 134 complementary to the hinge mounting 128 of the bracket and is pivotally connected thereto by a pivot pin 136. The angle of the pivot pin apertures in the lug is selected to provide a substantial positive angle of attack when the parts are assembled as best seen in FIG. 14.

Each blade also has a hinge type lug 138 at its underside adjacent to the inner rear corner. A control rod 140 is hingedly connected at its radially outer end to the stabilizer ring at 142 and at its radially inner end to lug 138 at 144. FIGS. 14, 15, and 16 show a typical blade in neutral position. When the wing is rotating, the blade in neutral position will produce lift but not thrust. When the blade is swung up to the position of FIG. 17, it has a substantial angle of attack with respect to the vertical plane in a direction to produce a thrust component inward of the wing. When it is swung down to the position of FIG. 18, it has a substantial angle of attack with respect to the vertical plane in a direction to produce a thrust component outward of the wing. The blade produces a lesser but still substantial amount of lift in either of the extreme positions.

The neutral position of FIG. 16 is shown with blade 130 in a substantially horizontal position but angled downwardly at approximately 10°. The reason for this is to provide greater lateral stability and control. If the blades on opposite sides of the aircraft were exactly horizontal and air turbulance were encountered which tilted the aircraft about its longitudinal axis, there would be no way to increase lift on the low side of the aircraft. However, with a slight angle on the blades in the neutral position, correction can be made by moving the stabilizer ring to raise the blade on the low side to a true horizontal position to increase lift on that side and lower the blade on the high side of the aircraft still further to decrease lift on that side to thereby return the aircraft to level flight.

Considering FIG. 13 it will be seen that the stabilizer ring is adjusted to full aft. At the right hand side of the aircraft, blade 130 is in neutral position producing maximum lift but no thrust. As the wing rotates in the direction of the arrows, the stabilizer ring effectively moves gradually toward the inner periphery of the ring moving control rod 140 radially inward and raising the blade toward the position of FIG. 17 where the maximum radial inward thrust is produced. As rotation continues, the blade will lower to neutral at the left side of the aircraft and continue lowering to maximum down at the aft portion of its travel. It will be seen that both maximum thrusts are toward the aft end, producing a maximum forward thrust vector, with reduced lifts in the fore and aft quadrants and maximum lifts in the side quadrants. Since the stabilizer ring can be eccentrically displaced in any direction by manipulation of the controlling mechanism, it will be seen that the craft can readily be steered in any desired direction. The same is true of the other forms utilizing the stabilizer ring.

The invention has been described in detail with particular reference to preferred embodiments thereof, but it will be understood that variations and modifications can be effected within the spirit and scope of the invention.

I claim:

1. An aircraft provided with means for achieving flight in various modes including generally vertical ascent and descent, hovering, and lateral travel, comprising:
   a fuselage provided with a power plant, a pilot's compartment having pilot operable control means, and directional control surfaces;
   a vertically extending axle shaft rotatably mounted at its lower end on the fuselage;
   and an annular wing coaxially mounted at the upper end of the shaft, said wing having upper and lower surfaces and being rotatable about the axis of the shaft;
   the rotation of the wing applying centrifugal force to the air adjacent to the upper and lower surfaces to cause radial air flow across the surfaces from the inner periphery of the wing to the outer peripheral edge to energize the boundary layer and enhance laminar flow and produce a lifting force, the wing being free of any obstruction to the flow of air at any point around its outer periphery;
   a plurality of upstanding vanes are mounted on the radially inner portion of the wing and are spaced substantially equally around the inner periphery and extend substantially vertically;
   the power plant is drivingly connected to the axle shaft and thence to the wing to cause its rotation, the vanes rotating with the wing, driving the air adjacent to the inner portion of the wing centrifugally across the wing to enhance the lifting force; and
   said vanes being retractable at least partially into the contour of the annular wing to reduce their effect.

2. An aircraft, as claimed in claim 1, wherein:
   a guide member is mounted in neutral position concentric with the axle shaft adjacent to the plane of the wing;
   the guide member is movable laterally in all directions and is connected to the pilot operable control means in the fuselage to be positioned in response to the positioning of the control means;
   a control ring is rotatably mounted on the guide member;
   a stabilizer ring is located adjacent to the inner periphery of the annular wing and is flexibly connected to each of the vanes;
   the control ring is connected to the stabilizer ring by a plurality of radial tie rods to maintain the rings in concentric relation;
   the guide member in neutral position concentric with the axle shaft acts to maintain the stabilizer ring concentric with the wing with all of the vanes partially extended in an equal amount; and
   the guide member in laterally displaced position acts to maintain the stabilizer ring in an eccentric position with respect to the wing to cause the vanes to extend from and retract into the wing during the course of rotation.

3. An aircraft, as claimed in claim 2, wherein:
   the curvature of the stabilizer ring in a vertical plane passing radially through the stabilizer ring and the wing corresponds to the curvature of the inner portion of the upper surface of the wing; and
   the stabilizer ring when spaced adjacent the inner periphery of the wing serves as an air flow guide to enhance laminar flow over the upper surface of the wing.

4. A wing for use on a rotary-winged aircraft comprising:
   an annulus having upper and lower surfaces forming an airfoil shape in radial section at all points around its circumference;
   an axle shaft having a first, upper, end connected to the annulus by a plurality of radially extending struts and a second, lower, end formed for rotatable engagement by mounting means on an aircraft fuselage and for driven connection to a power plant;
   the wing being rotatable in its plane to drive air adjacent to the wing centrifugally across its upper and lower surfaces from an inner periphery to an outer edge to energize the boundary layer, enhance laminar flow, and produce lifting force;
   the wing being free of any obstruction to the flow of air at any point around its outer periphery;
   a plurality of upstanding vanes mounted on the radially inner portion of the wing and spaced substantially equally around the inner periphery;
   the vanes extending vertically to engage the air adjacent to the wing and increase the rate of flow over the wing to enhance the lifting force; and the vanes being extendable and retractable into and out of the wing to vary the amount of lift produced on various portions of the wing during its rotation.

5. A wing, as claimed in claim 4, wherein:

the vanes are so mounted as to move generally radially in the plane of the wing into and out of the contour of the inner portion of the wing.

6. A wing, as claimed in claim 4, wherein:

controlling mechanism is located adjacent to the upper end of the axle shaft and is provided with the means for connection to pilot operated control means; and a stabilizer ring is connected to the vanes and to the controlling mechanism, the stabilizer ring being eccentrically adjustable in response to the positioning of the controlling mechanism to vary the degree of extension of the vanes.

7. A wing, as claimed in claim 6, wherein:

the controlling mechanism comprises a guide member located adjacent to the upper end of the axle shaft and concentric therewith in neutral position;

the guide member is laterally movable in all directions in response to positioning of the pilot operated control means;

a control ring is journaled on the guide member;

a plurality of radially extending tie rods connect the control ring to the stabilizer ring;

the guide member in neutral position concentric with the axle shaft acts to maintain the stabilizer ring concentric with the wing with all of the vanes partially extended in an equal amount; and the guide member in laterally displaced position acts to maintain the stabilizer ring in an eccentric position with respect to the wing to cause the vanes to extend from and retract into the wing during the course of rotation.

8. A wing, as claimed in claim 7, wherein:

the stabilizer ring is flexibly connected to the inner portions of the vanes;

the curvature of the stabilizer ring in a vertical plane passing radially through the stabilizer ring and the wing corresponds to the curvature of the inner portion of the upper surface of the wing; and the stabilizer ring when spaced radially inward of the adjacent portion of the wing serves as an air flow guide to enhance laminar flow over the upper surface of the wing.

9. A wing for use on a rotary-winged aircraft comprising:

an annulus having upper and lower surfaces forming an airfoil shape in radial section at all points around its circumference;

an axle shaft having a first, upper, end connected to the annulus by a plurality of radially extending struts and a second, lower, end formed for rotatable engagement by mounting means on an aircraft fuselage and for driven connection to a power plant;

the wing being rotatable in its plane to drive air adjacent to the wing centrifugally across its upper and lower surfaces from an inner periphery to an outer edge to energize the boundary layer, enhance laminar flow, and produce lifting force;

the wing being free of any obstructions to the flow of air at any point around its outer periphery;

a plurality of upstanding vanes mounted on the radially inner portion of the wing and spaced substantially equally around the inner periphery;

the vanes extending vertically to engage the air adjacent to the wing and increase the rate of flow over the wing to enhance the lifting force; and an airfoil blade attached to the inner end of each vane radially inward of the inner periphery of the wing and set at a positive angle of attack in the direction of rotation of the wing to produce direct lift.

10. A wing, as claimed in claim 9, wherein:

the vanes are extendable and retractable into and out of the wing to vary the amount of lift produced on various portions of the wing during its rotation.

11. A wing, as claimed in claim 9, wherein:

each blade is hingedly mounted to the wing by a bracket having a pivot axis which is parallel to the plane of the wing and substantially tangent to its inner periphery at the location of the bracket with each blade, in neutral position, having a positive angle of attack in the direction of rotation of the wing to produce said direct lift;

a stabilizer ring is mounted to the wing and rotatable therewith and is eccentrically adjustable in the general plane of the wing;

a control rod for each blade is connected at one end to the stabilizer ring and at the other end to the blade at a point below said pivot axis to cause upward swinging of the blade in response to radially inward movement of the control rod and downward swinging of the blade in response to radially outward movement of the control rod;

the upward swinging of each blade produces a radially inward thrust component with a reduced lift component and the downward swinging of each blade produces a radially outward thrust component with a reduced lift component;

a controlling mechanism is located adjacent to the upper end of the axle shaft and is provided with means for connection to pilot operated control means;

the stabilizer ring is connected to the controlling mechanism and is eccentrically adjustable in response to the positioning of the controlling mechanism; and eccentric positioning of the stabilizer ring causes each blade to pass from maximum down swing through neutral to maximum up swing during 180 degrees of rotation of the wing and produce a combined thrust vector in a single direction.

* * * * *